(12) United States Patent
Park

(10) Patent No.: US 7,961,420 B2
(45) Date of Patent: Jun. 14, 2011

(54) DISK DRIVE APPARATUS AND METHOD OF ADAPTIVELY CONTROLLING FLYING HEIGHT OF MAGNETIC HEAD THEREIN

(75) Inventor: Jong-lak Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 12/098,630

(22) Filed: Apr. 7, 2008

(65) Prior Publication Data

US 2008/0247073 A1    Oct. 9, 2008

(30) Foreign Application Priority Data

Apr. 5, 2007   (KR) .................. 10-2007-0033758

(51) Int. Cl.
*G11B 21/02* (2006.01)
(52) U.S. Cl. ........................................... 360/75
(58) Field of Classification Search ........... 360/75, 360/59, 69
See application file for complete search history.

(56) References Cited

U.S. PATENT DOCUMENTS

| | | | | |
|---|---|---|---|---|
| 5,991,113 | A * | 11/1999 | Meyer et al. ............ | 360/75 |
| 7,457,073 | B2 * | 11/2008 | Kurita et al. ............ | 360/75 |
| 7,518,818 | B2 * | 4/2009 | Yamazaki et al. ........ | 360/75 |
| 7,633,703 | B2 * | 12/2009 | Ota ....................... | 360/75 |
| 2004/0114268 | A1 | 6/2004 | Satoh et al. | |
| 2006/0066983 | A1 | 3/2006 | Pit et al. | |
| 2006/0119974 | A1 | 6/2006 | Yamazaki et al. | |
| 2006/0126224 | A1 | 6/2006 | Sakamoto et al. | |
| 2006/0279878 | A1 | 12/2006 | Shiramatsu et al. | |
| 2007/0030593 | A1 | 2/2007 | Hiroyuki et al. | |
| 2007/0058280 | A1 | 3/2007 | Wada et al. | |
| 2007/0064332 | A1 | 3/2007 | Higashiya | |

FOREIGN PATENT DOCUMENTS

| | | |
|---|---|---|
| EP | 1 843 329 | 10/2007 |
| JP | 2004-79126 | 3/2004 |

OTHER PUBLICATIONS

European Search Report dated Jul. 1, 2008 issued in EP08153505.6.
Chinese Office Action issued on Nov. 17, 2010 in CN Application No. 200810161198.6.

* cited by examiner

*Primary Examiner* — Fred Tzeng
(74) *Attorney, Agent, or Firm* — Stanzione & Kim, LLP

(57) ABSTRACT

An apparatus and method of adaptively controlling a flying height of a magnetic head above a disk in accordance with a change in a user environment of a disk drive apparatus includes determining if a parameter reset condition related to the flying height of the magnetic head has been set; measuring a temperature of a disk drive if the parameter reset condition has been set, obtaining a flying height profile representing a variation of spacing between the magnetic head and a disk in accordance with a variation of power supplied to a heater controlling the flying height of the magnetic head at the measured temperature, based on a reference flying height profile stored in the disk drive, and determining the power that is to be supplied to the heater of the magnetic head, the power corresponding to a target flying height of the magnetic head from the obtained flying height profile.

25 Claims, 7 Drawing Sheets

Before FOD

After FOD

DISK DRIVE APPARATUS AND METHOD OF ADAPTIVELY CONTROLLING FLYING HEIGHT OF MAGNETIC HEAD THEREIN

CROSS-REFERENCE TO RELATED APPLICATIONS

This application claims priority under 35 U.S.C. §119 (a) from Korean Patent Application No. 10-2007-0033758, filed on Apr. 5, 2007, in the Korean Intellectual Property Office, the disclosure of which is incorporated herein in its entirety by reference.

BACKGROUND OF THE INVENTION

1. Field of the Invention

The present general inventive concept relates to a disk drive apparatus and a method of controlling a disk drive apparatus, and more particularly, to a disk drive apparatus and method of adaptively controlling a flying height of a magnetic head over a disk according to a change in a user environment of the disk drive apparatus.

2. Description of the Related Art

Conventional disk drives have been disclosed in Japanese Laid-Open Patent Publication No. 2004-079126 and U.S. Patent Application Publication No. 2006-0119974.

Hard disk drives (HDDs) contribute to the operation of a computer system by reproducing/recording data from/on a disk using a magnetic head. Due to the recent demand on the HDDs with high capacity, high density, and compact size, more accurate mechanisms are required to increase a bit per inch (BPI) indicating the density in a rotational direction of a disk and to increase a track per inch (TPI) indicating the density in a radial direction of the disk.

Read/write performance of HDDs is influenced by a flying height of a magnetic head with respect to the surface of a disk. As the flying height of the magnetic head with respect to the surface of the disk decreases, the read/write performance increases. However, this may also increase the possibility that the magnetic head will collide against the surface of the disk. On the other hand, as the flying height of the magnetic head with respect to the surface of the disk increases, the possibility for collision between the magnetic head and the disk can decrease; however, the read/write performance decreases.

In order to determine a flying on demand (FOD) power value used to adjust a target flying height, a flying height profile of the magnetic head in accordance with a change in FOD power is obtained through a touch down test in a burn-in test of a HDD.

When the HDD operates according to user conditions, a normalized flying height profile at a temperature detected based on the user conditions is obtained by reflecting a correction value in accordance with a change in a temperature statistically obtained from a flying height profile obtained at a single temperature during the burn-in test.

However, when the flying height profile is normalized in accordance to the temperature based on the statistical method, HDDs vary depending on the component characteristics and assembled states. Accordingly, a conventional apparatus and method can not obtain an optimal flying height profile for each of the HDDs according to the user environment.

SUMMARY OF THE INVENTION

The present general inventive concept provides a method of adaptively controlling a flying height of a magnetic head to determine the flying on demand (FOD) power by obtaining each flying height profile depending on a variation of the FOD power of each disk drive according to an operating temperature and/or a user environment, and a disk drive apparatus using the same. The present general inventive concept also provides a computer-readable medium to store computer-readable codes as a program to execute the method on a computer.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of adaptively controlling a flying height of a magnetic head, the method including determining if a parameter reset condition related to the flying height of the magnetic head has been set, measuring a temperature of a disk drive apparatus if the parameter reset condition has been set, obtaining a flying height profile to represent a variation of spacing between the magnetic head and a disk according to a variation of power supplied to a heater to control the flying height of the magnetic head at the measured temperature with respect to a flying height profile stored in the disk drive apparatus, and determining the power that is to be supplied to the heater of the magnetic head to correspond to a target flying height of the magnetic head from the obtained flying height profile.

The parameter reset condition may include a condition so as to change the disk drive into an idle mode.

The flying height profile may be obtained in a read mode and a write mode.

The obtaining of the flying height profile may include searching a flying height profile of a temperature closest to the measured temperature from among temperatures of flying height profiles stored based on temperature in the disk drive, and calculating a temperature difference between the measured temperature and the temperature of the searched flying height profile; comparing the calculated temperature difference with an initially set threshold value; re-measuring the flying height profile of the magnetic head with respect to the measured temperature if the calculated temperature difference exceeds the threshold value, and storing the re-measured flying height profile; and obtaining a normalized flying height profile with respect to the measured temperature from among the flying height profiles stored in the disk drive if the calculated temperature difference does not exceed the threshold value.

The re-measuring of the flying height profile may include measuring a variation of spacing between the magnetic head and the disk with respect to the power supplied to the heater of the magnetic head, while varying the power supplied to the heater until the magnetic head contacts the disk; and obtaining the flying height profile with respect to the measured temperature.

The normalized flying height profile may be obtained based on a correction value with respect to the variation of temperature in the flying height profile of the temperature closest to the measured temperature from among the flying height profiles stored based on temperature in the disk drive.

The normalized flying height profile may be obtained by interpolation between the flying height profiles at uppermost and lowermost temperatures closest to the measured temperature from among the flying height profiles stored in the disk drive.

The foregoing and/or other aspects and utilities of the present general inventive concept may also be achieved by providing a disk drive apparatus including a disk storing data, a magnetic head including a magnetic read element to detect a magnetic field over the disk, a magnetic write element magnetizing the disk, and a heater configured to heat a structure to generate an air bearing surface between the surface of the disk and the magnetic read element and between the surface of the disk surface and the magnetic write element, a temperature sensor to measure an operating temperature of the disk drive, a memory to store the measured temperature and a flying height profile representing a variation of spacing between the magnetic head and the disk in accordance with a variation of power supplied to the heater; a controller calculating the flying height profile representing the variation of the spacing between the magnetic head and the disk in accordance with the variation of the power supplied to the heater at the temperature measured by the temperature sensor, to store the flying height profile in the memory, if the parameter reset condition related to the flying height of the magnetic head has been set, and to determine the power that is to be supplied to the heater corresponding to a target flying height of the magnetic head from the calculated flying height profile, and a current supplier generating a current corresponding to the power determined by the controller and supplying the generated current to the heater.

The controller may search from the memory the flying height profile having a temperature closest to the temperature measured by the temperature sensor, re-measure the flying height profile with respect to the measured temperature to store the re-measured flying height profile in the memory if a temperature difference between the measured temperature and the temperature of the searched flying height profile exceeds a threshold value, and calculate a normalized flying height profile with respect to the measured temperature from the flying height profile stored based on temperature in the disk drive if the temperature difference does not exceed the threshold value.

The foregoing and/or other aspects and utilities of the present general inventive concept may also be achieved by providing a computer-readable medium to store computer-readable codes as a program to determine an FOD power by obtaining a flying height profile in accordance with a variation of the FOD power in each disk drive, depending on an operating temperature of a user environment.

The foregoing and/or other aspects and utilities of the present general inventive concept may also be achieved by providing a method of controlling a flying height of a magnetic head from a disk in a disk drive apparatus, the method including supplying a current to a heater of a disk drive apparatus to generate a spacing between a magnetic head and a disk; measuring a variation of a temperature of the disk drive apparatus according to the current; and obtaining a new flying height profile according to the temperature variation.

The method may further include storing the obtained flying height profile in one of the disk and a memory unit of the disk drive apparatus.

The method may further include controlling the heater of the disk drive apparatus according to the obtained flying height profile.

The obtained flying height profile may include a first flying height profile to correspond to a read mode, and a second flying height profile to correspond to a write mode.

The supplying of the current may include supplying the current according to a reference flying height profile including a plurality of current values to be supplied to the heater, and a plurality of temperatures.

The measuring of the temperature variation may include measuring a first temperature before the supply of the current to the heater; and measuring a second temperature after the supply of the current to the heater so as to measuring the temperature variation between the first temperature and the second temperature.

The foregoing and/or other aspects and utilities of the present general inventive concept may also be achieved by providing an apparatus to control a flying height of a magnetic head from a disk in a disk drive apparatus, including a controller to supply a current to a heater of the disk drive apparatus to generate a spacing between a magnetic head, and a temperature sensor to measure a temperature of the disk drive apparatus according to the current so as to measure a variation of the temperature, wherein the controller obtains a new flying height profile according to the temperature variation.

The apparatus may further include a memory unit disposed in the disk drive apparatus to store the obtained flying height profile.

The controller may control the heater of the disk drive apparatus according to the obtained flying height profile.

The obtained flying height profile may include a first flying height profile to correspond to a read mode, and a second flying height profile to correspond to a write mode, and the controller may control the heater according to a first current and a second current of the first flying height profile and the second flying height profile in the read mode and the write mode, respectively, to maintain a same target flying height of the spacing in the read mode and the write mode.

The controller may supply the current according to a reference flying height profile including a plurality of current values to be supplied to the heater, and a plurality of temperatures, and the controller may select one of the current values as the current to be supplied to the heater.

The temperature sensor may measure a first temperature before the supply of the current to the heater, and a second temperature after the supply of the current to the heater so as to measuring the temperature variation between the first temperature and the second temperature.

The foregoing and/or other aspects and utilities of the present general inventive concept may also be achieved by providing a disk drive apparatus to control a flying height of a magnetic head from a disk, the apparatus including a temperature sensor to detect a temperature of the disk drive apparatus, a memory unit to store a reference flying height profile and a new flying height profile modified from the reference flying height profile according to a temperature variance of the detected temperature of the temperature sensor, and a controller to supply a current to a heater according to the detected temperature and the new flying height profile.

The foregoing and/or other aspects and utilities of the present general inventive concept may also be achieved by providing a disk drive apparatus to control a flying height of a magnetic head from a disk, the apparatus including a memory unit to store a flying height profile having a plurality of temperatures and current values to correspond to the respective temperatures, a temperature sensor to detect a current temperature of the disk drive apparatus, and a controller to supply a current to a heater according to one of the current values of the new flying height profile to correspond to the detected temperature.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE PREFERRED EMBODIMENTS

Figure 1:
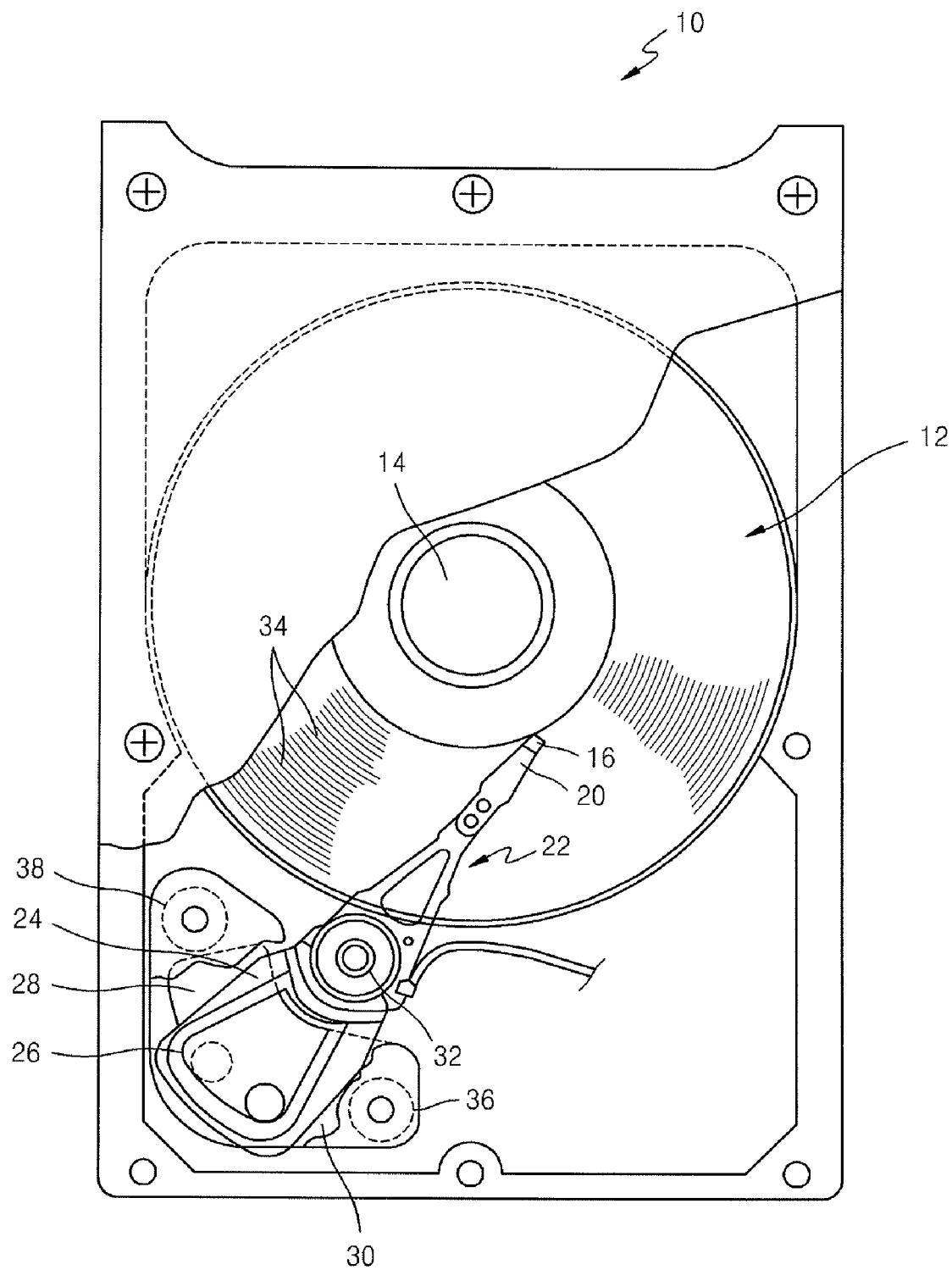
FIG. 1 is a plan view illustrating a head disk assembly of a disk drive apparatus according to an embodiment of the present general inventive concept.

The present general inventive concept will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to one skilled in the art. In the embodiments of the present general inventive concept, like reference numerals refer to the like elements throughout. The embodiments are described below in order to explain the present general inventive concept by referring to the figures.

A hard disk drive (HDD) apparatus is implemented with a combination of electrical circuits and a head disk assembly (HDA) including a plurality of mechanical components.

FIG. 1 is a plan view illustrating an HDD having an HDA according to an embodiment of the present general inventive concept. The HDA 10 includes at least one disk 12, which is magnetic, to be rotated by a spindle motor 14. The HDA 10 further includes a transducer 16a disposed adjacent to a surface of the disk 12.

The transducer 16a can read data from the disk 12 by detecting a magnetic field of the disk 12 and write data on the disk 12 by magnetizing the disk 12, and the transducer is generally associated with a surface of the disk 12. Although the transducer 16a has been described as a single unit, it should be understood that the transducer 16a includes a write transducer (hereinafter, referred to as a writer) to magnetize the disk 12 and a read transducer (hereinafter, referred to as a reader) to detect the magnetic field of the disk 12. The reader of the transducer 16a may be constructed from a magneto-resistive (MR) element.

The transducer 16a may be integrated into a magnetic head 16, and the magnetic head 16 is configured to generate an air bearing between the transducer 16a and the surface of the disk 12. Additionally, the magnetic head 16 is integrated into a head stack assembly (HSA) 22 that is attached to an actuator arm 24 having a voice coil 26 that is located adjacent to a magnetic assembly 28 to specify a voice coil motor (VCM) 30. The current supplied to the VCM 30 generates a torque that rotates the actuator arm 24 about a bearing assembly 32 within the stoppers 36 and 38. The rotation of the actuator arm 24 about the bearing assembly 32 causes the transducer 16a to move across the surface of the disk 12.

Data is typically stored in annular tracks 34 of the disk 12, and each of the tracks 34 includes a plurality of sectors. Each of the sectors includes a data field and a servo field in which a preamble, a servo address/index mark (SAM/SIM), a gray code, and burst signals A, B, C, and D are recorded in the servo field. The transducer moves across the surface of the disk 12 so as to read or write data on other tracks.

Figure 2:
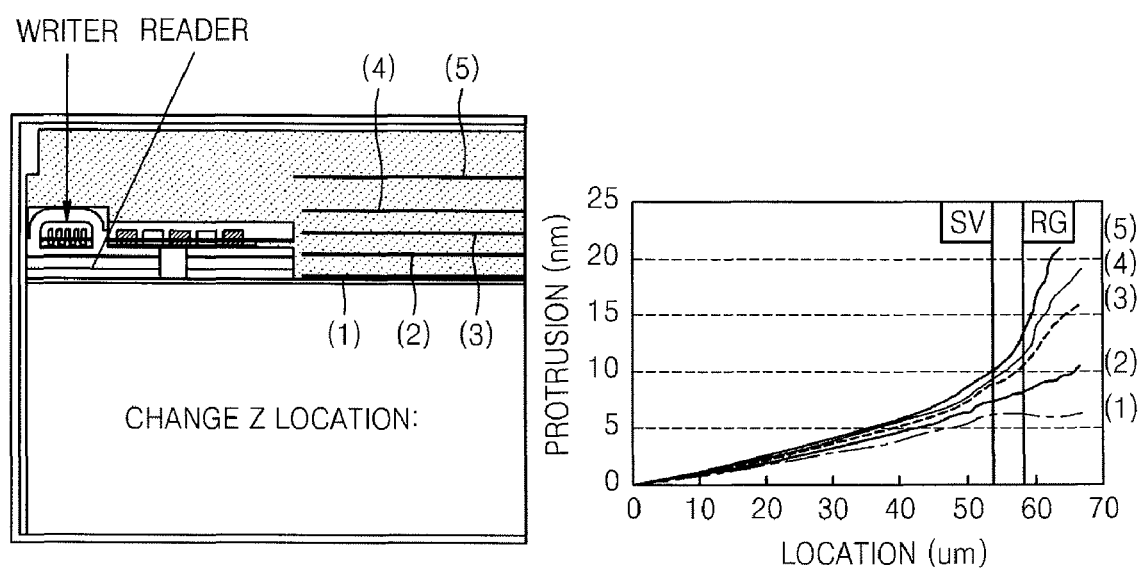
FIG. 2 is a cross-sectional view illustrating a method of determining a location of a heater installed in a magnetic head of a disk drive apparatus and a relationship between an air bearing protrusion and the location of the heater, according to an embodiment the present general inventive concept.

The magnetic head 16 is configured to create an air bearing surface between the surface of the disk 12 and the reader/writer of the transducer 16a, and includes a heater 16b that heats the magnetic head 16, and the magnetic head 16 may be made with a heating coil. Referring to FIG. 2, the protrusion of the air bearing surface of the magnetic head 16 is measured by applying a current to the heating coil as a location Z of the heating coil is changed, and thus, a location having an optimal protrusion condition is determined. A graph of FIG. 2 illustrates a location Z (1, 2, 3, 4, and 5) in a cross sectional view of the magnetic head 16, and a location SV and RG in another cross-sectional view of the magnetic head 16. Referring to FIG. 2, the heating coil is installed in the location 1 in which the air bearing surface protrudes relatively uniformly between the location SV of the reader and the location RG of the writer.

Figure 3:
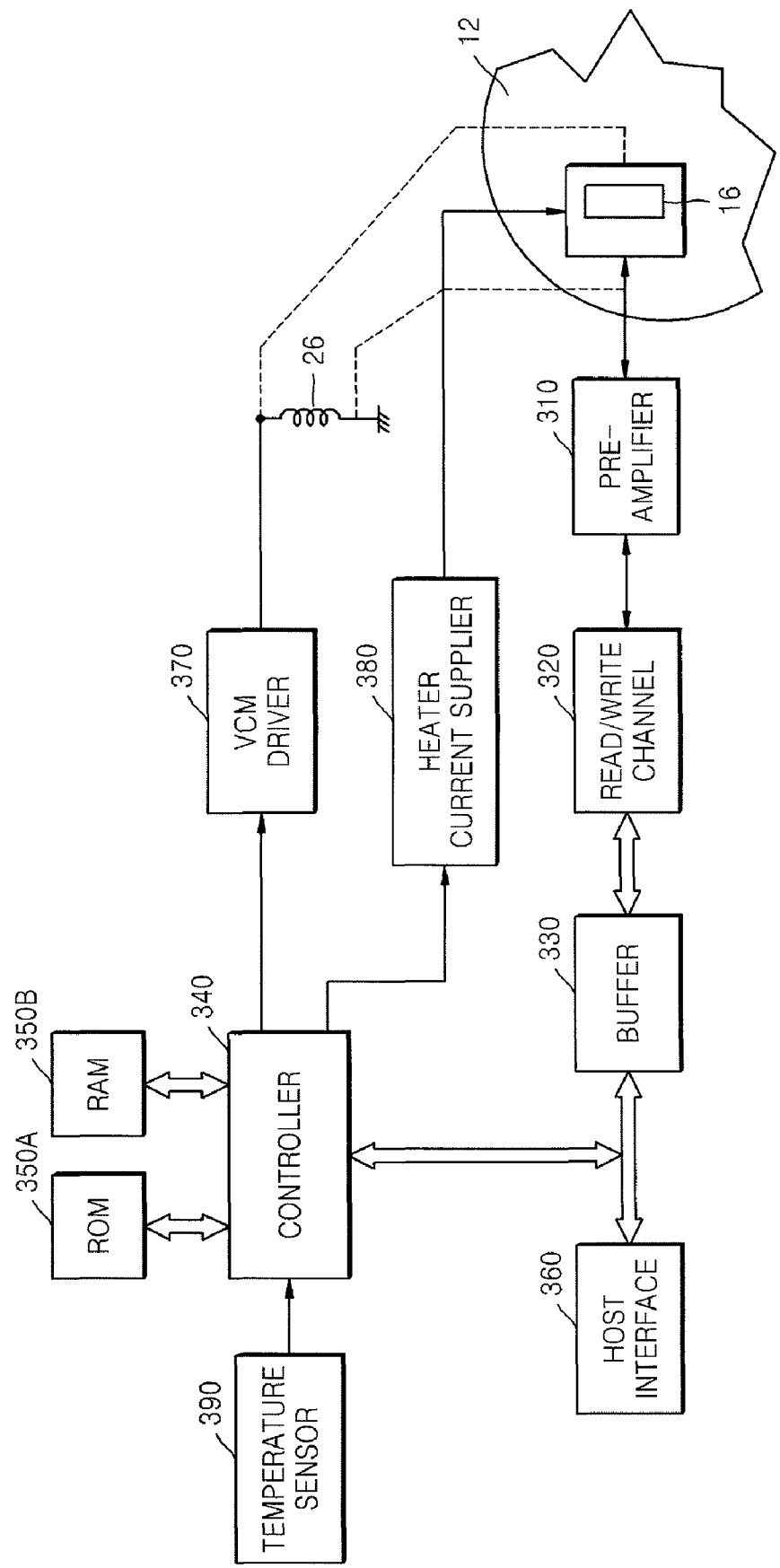
FIG. 3 is a block diagram illustrating a disk drive apparatus according to an embodiment of the present general inventive concept.

FIG. 3 is a block diagram illustrating a disk drive apparatus according to an embodiment of the present general inventive concept. Referring to FIGS. 1 and 3, the disk drive apparatus according to the present embodiment of the present general inventive concept includes the disk 12, the magnetic head 16, a pre-amplifier 310, a read/write channel 320, a buffer 330, a controller 340, a read-only memory (ROM) 350A, a random access memory (RAM) 350B, a host interface 360, a VCM driver 370, a heater current supplier 380, and a temperature sensor 390.

The ROM 350A stores the control firmware of the disk drive apparatus and control data thereof. Specifically, the ROM 350A stores flying height profile information of the magnetic head 16. The flying height profile information of the magnetic head 16 represents a variation in spacing between the magnetic head 16 and the surface of the disk 12 with respect to a change in power supplied to the heater of the magnetic head 16 so as to control a flying height of the magnetic head 16 in accordance with a temperature measured in a user environment during a burn-in test. It is possible that the flying height profile information of the magnetic head 16 may be stored in a maintenance cylinder of the disk 12, called a system cylinder, instead of the ROM 350A.

The RAM 350B stores information necessary to drive the disk drive apparatus, which is read from the ROM 350A or the disk 12 in a startup operation of the disk drive apparatus.

The temperature sensor 390 measures an internal temperature of the disk drive apparatus and may be configured with a thermistor. The temperature sensor 390 may be disposed within the HDA 10 of the disk drive apparatus, and may be disposed to detect a temperature near the surface of the disk 12. It is also possible that the temperature sensor 390 may be disposed outside of the HAD 10 to detect the temperature transmitted through a casing of the HAD 10.

The controller 340 analyzes a command received from a host device (not illustrated) via the host interface 360 and performs a control operation according to the analysis result of the received command. The controller 340 supplies a control signal to the VCM driver 370 to control the excitation of a VCM and the movement of the magnetic head 16 with respect to the disk 12 in the control operation.

While reproducing a preamble signal, a SAM/SIM, a gray code, and burst signals A, B, C, and D recorded in a servo field of a sector of the disk 12, the read/write channel 320 provides information necessary for the controller 340 to perform a track-seek and track-following control. Particularly, the read/write channel 320 determines a servo gain of an automatic gain control (AGC) circuit (not illustrated) using the preamble signal.

An operation of the disk drive apparatus will now be described.

In a read mode, the pre-amplifier 310 primarily amplifies an electrical signal detected from the disk 12 by the reader of the magnetic head 16. The read/write channel 320 amplifies the signal amplified by the pre-amplifier 310 to a predetermined level to be used as the information, and the AGC circuit controls a servo gain to control the rotation of the disk 12 and/or the movement of the magnetic head 16 using a coil 26. The read/write channel 320 encodes the signal amplified to the predetermined level by the AGC circuit into a digital signal readable by the host device (not illustrated), converts the digital signal into stream data, temporarily stores the stream data in the buffer 330, and transmits the stream data to the host device via the host interface 360.

In a write mode, the buffer 330 temporarily stores data received from the host device via the host interface 360, and the read/write channel 320 converts the data sequentially outputted from the buffer 330 into a binary data stream suitable for a write channel. The pre-amplifier 310 amplifies a write current, and the writer of the magnetic head 16 records the data using the amplified write current on the disk 12. The above described read and write modes can be similar to a conventional read mode and a conventional write mode of a conventional disk drive apparatus and can be used operations of the read mode and the write mode in the disk drive apparatus of the present embodiment.

Then, an operation of the controller 340 performing the adaptive control of the flying height of the magnetic head 16 according to an embodiment of the present general inventive concept will now be described.

Upon a periodic monitoring of a current execution mode, when a flying height setting condition of the magnetic head 16 is set, the controller 340 obtains a flying height profile representing the variation of the spacing between the magnetic head 16 and the disk 12 according to a change in the power supplied to the heater 16b installed in the magnetic head 16 at a temperature measured by the temperature sensor 390. The controller 340 determines a flying on demand (FOD) power to correspond to a target flying height of the magnetic head 16 from the obtained flying height profile, the FOD power represents a power supplied to the heater installed in the magnetic head 16.

The heater current supplier 380 generates current corresponding to the FOD power determined by the controller 340 to supply the current to the heater 16b of the magnetic head 16. The current supplied to the heater 16b in the read mode may be set to be different from the current supplied to the heater 16b in the write mode, so that the spacing between the disk 12 and the magnetic head 16 in the read mode and the write mode can be substantially equal to the target flying height of the magnetic head 16.

Figure 4:
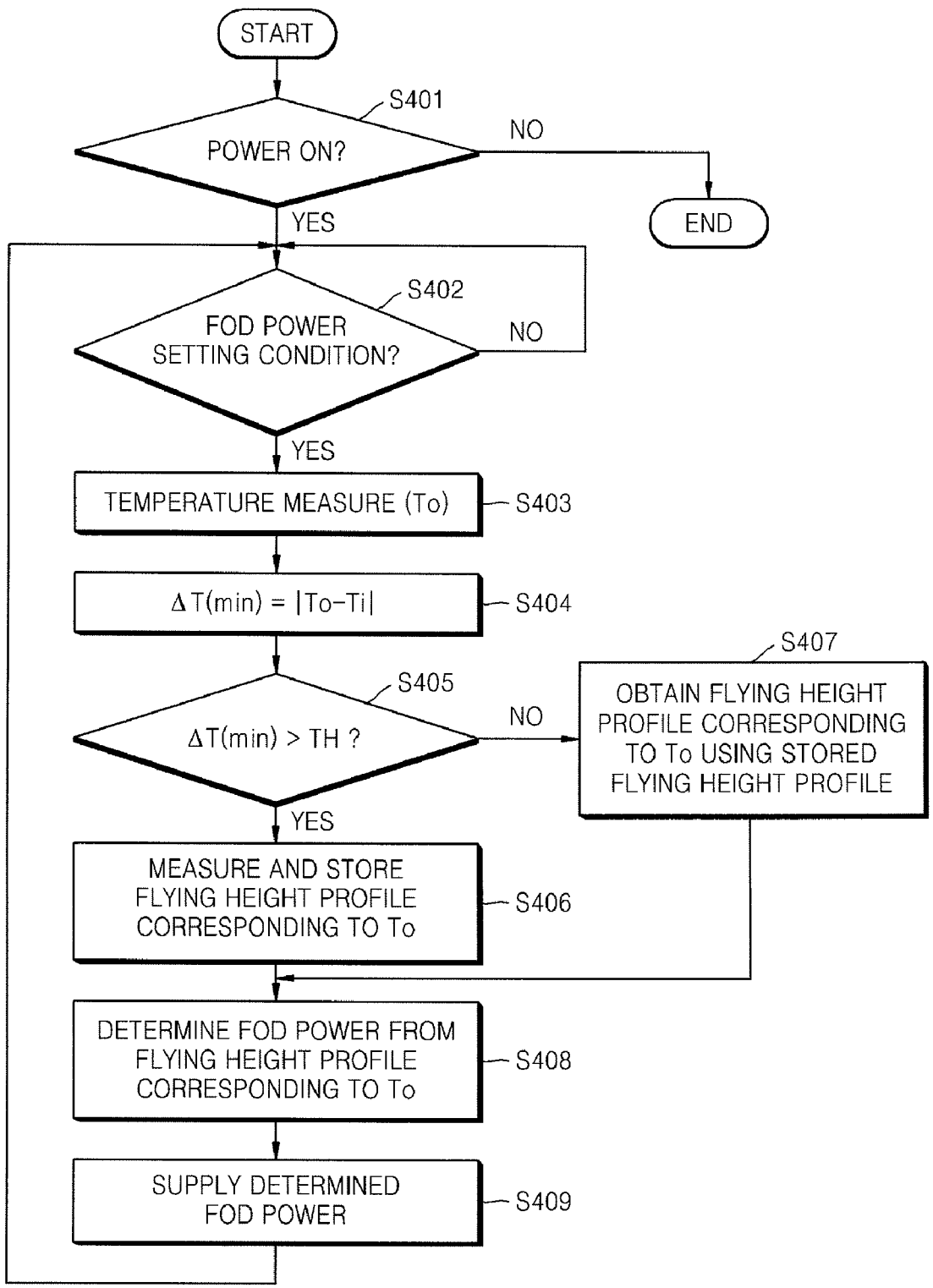
FIG. 4 is a flowchart illustrating a method of adaptively controlling a flying height of a magnetic head according to an embodiment of the present general inventive concept.

FIG. 4 is a flowchart illustrating a method of adaptively controlling the flying height of the magnetic head 16 according to an embodiment of the present general inventive concept.

Referring to FIGS. 1, 3, and 4, the method of adaptively controlling the flying height of the magnetic head 16 according to the control process of the controller 340 will now be described in detail.

The flying height profile information of the magnetic head 16 is stored in the ROM 350A or the maintenance cylinder of the disk 12 together with the operating temperature information of the disk drive apparatus. The flying height profile information of the magnetic head 16 represents the variation of the spacing between the magnetic head 16 and the disk 12 in accordance with the change in the power supplied to the heater installed in the magnetic head 16, the power is measured in the burn-in test of the disk drive apparatus before the disk drive apparatus is packaged.

In operation S401, the controller 340 determines whether the disk drive apparatus is powered on in accordance with the user environment. In operation S402, the controller 340 determines if the disk drive has changed into an FOD power setting condition. The FOD power setting condition represents a condition to set a mode of determining a power that is to be supplied to the heater 16a installed in the magnetic head 16 from the flying height profile corresponding to a measured temperature. For example, the FOD power setting condition may be set to change the disk drive apparatus into an idle mode. Here, the flying height profile may be a reference flying height profile to represent a relationship between a temperature and a current to correspond to the FOD power, for example.

In operation S403, the controller 340 measures an operating temperature T0 of the disk drive using the temperature sensor 390 if the disk drive has changed into the FOD power setting condition in operation S402.

In operation S404, the controller 340 searches for the flying height profile having a temperature closest to the measured operating temperature T0 of the disk drive from among the temperatures of the flying height profile of the magnetic head 16, which are stored in the ROM 350A or the maintenance cylinder of the disk 12, and calculates a temperature difference $\Delta T$ (min) between the measured operating temperature T0 and the temperature of the searched flying height profile of the magnetic head 16.

In operation S405, the controller 340 compares the temperature difference $\Delta T$ (min) with a threshold value TH, where the threshold value TH represents a temperature difference at which the accuracy of the profile is unreliable by normalizing the flying height profile of the measured current temperature from the previously stored flying height profile of the temperature closest to the measured operating temperature T0. The threshold value TH can be set by the experiment when the HDD apparatus is designed.

In operation S406, if the temperature difference $\Delta T$ (min) is greater than the threshold voltage TH, the controller 340 newly measures a new flying height profile of the magnetic head 16 at the measured current temperature T0 to store the newly measured flying height profile in the ROM 350A or the maintenance cylinder of the disk 12.

The flying height profile of the magnetic head 16 can be measured according to the read mode and the write mode.

In the write mode and the read mode, AGC gain values of the AGC circuit of the read/write channel 320 are measured while increasing the power supplied to the heater in the test track from zero voltage by a predetermined value, until the magnetic head 16 contacts the disk 12. The AGC gain values represent AGC gain values set while reproducing the data field or the servo field. In the present embodiment, a servo AGC gain value TAA is used.

Whether the magnetic head 16 contacts the disk 12 is determined by monitoring a position error signal. If a level of the position error signal exceeds a specific value, it is determined that the magnetic head 16 has contacted the disk 12.

Figure 5:
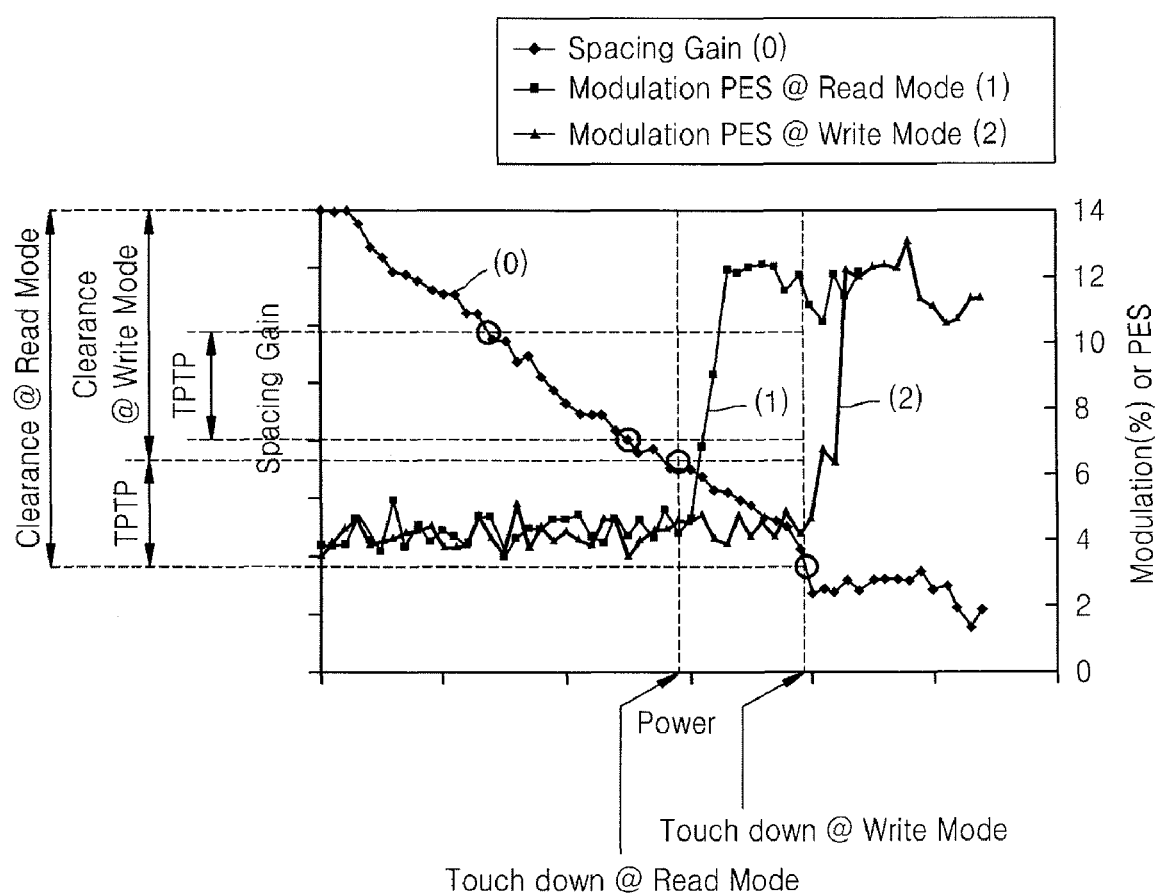
FIG. 5 is a graph illustrating a relationship between the power of a heater and a spacing gain corresponding to a flying height of a magnetic head in a read mode and a write mode so as to explain a flying height profile of the magnetic head according to an embodiment of the present general inventive concept.

The flying height profile of the magnetic head 16 over the disk 12 with respect to a variation in the power PWR of the heater is obtained using a Wallace spacing loss equation in terms of amplitude, as illustrated in FIG. 5.

The Wallace spacing loss equation is expressed in Equation 1 below.

$$d=(\lambda/2\pi) \times Ls, \quad \text{(Equation 1)}$$

wherein d=variation of magnetic space between a disk and a magnetic head,

λ=recording wavelength=linear velocity/recording frequency,

Ls=Ln (TAA1/TAA2),

TAA1=previous AGC gain value, and

TAA2=present AGC gain value.

Accordingly, the variation of the magnetic space between the disk 12 and the magnetic head 16 corresponding to the variation of the AGC gain value may be obtained using Equation 1. Since the AGC gain values according to the variation of the power PWR of the heater are measured, the variation of the magnetic space between the disk 12 and the magnetic head 16 according to the variation of the power PWR of the heater, i.e., the variation of the flying height of the magnetic head 16 can be obtained.

In operation S407, if the temperature difference ΔT (min) does not exceed the threshold value TH, the flying height profile of the measured current temperature is obtained using the flying height profiles stored in the ROM 350A or the maintenance cylinder of the disk 12. As one example, the flying height profile having a temperature closest to the measured operating temperature T0 from among the temperatures of the flying height profiles stored in the ROM 350A or the maintenance cylinder of the disk 12 is searched. Then, the flying height profile for the measured current temperature T0 is obtained based on a correction value corresponding to the difference value between the measured temperature of the searched flying height profile and the measured current temperature T0 of the searched flying height profile. As another example, the flying height profile corresponding to the measured current temperature T0 may be obtained through an interpolation between the flying height profiles of the uppermost and lowermost temperatures closest to the measured temperature T0, based on the measured current temperature T0 from among the flying height profiles stored in the ROM 350A or the maintenance cylinder of the disk 12 for each temperature.

In operation S408, the FOD power that is to be supplied to the heater corresponding to the target flying height of the magnetic head 16 is determined from the flying height profile of the measured current temperature T0, which is obtained in operation S406 or S407.

In operation S409, the flying height of the magnetic head 16 is adjusted by supplying the heater installed in the magnetic head 16 with the current generated by the heater current supplier and corresponding to the FOD power determined in operation S408.

Figure 6A:
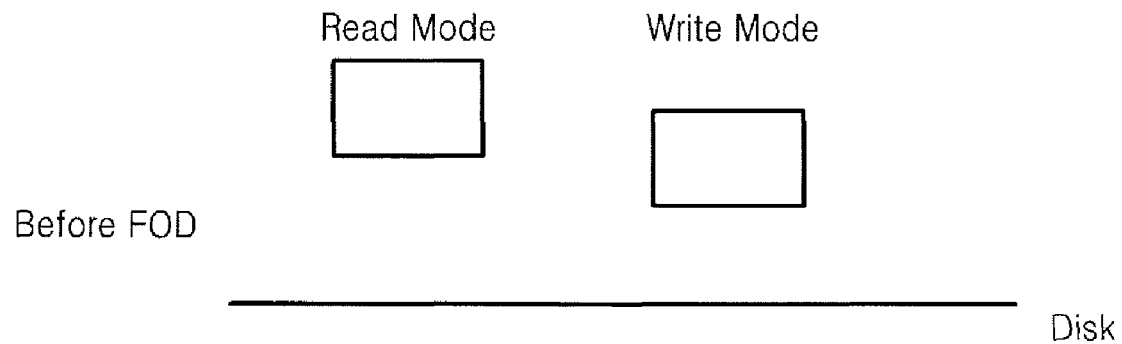
FIG. 6A is a view illustrating a difference of flying heights of a magnetic head in a read mode and a write mode before current is supplied to a heater of the magnetic head, according to an embodiment of the present general inventive concept.
Figure 6B:
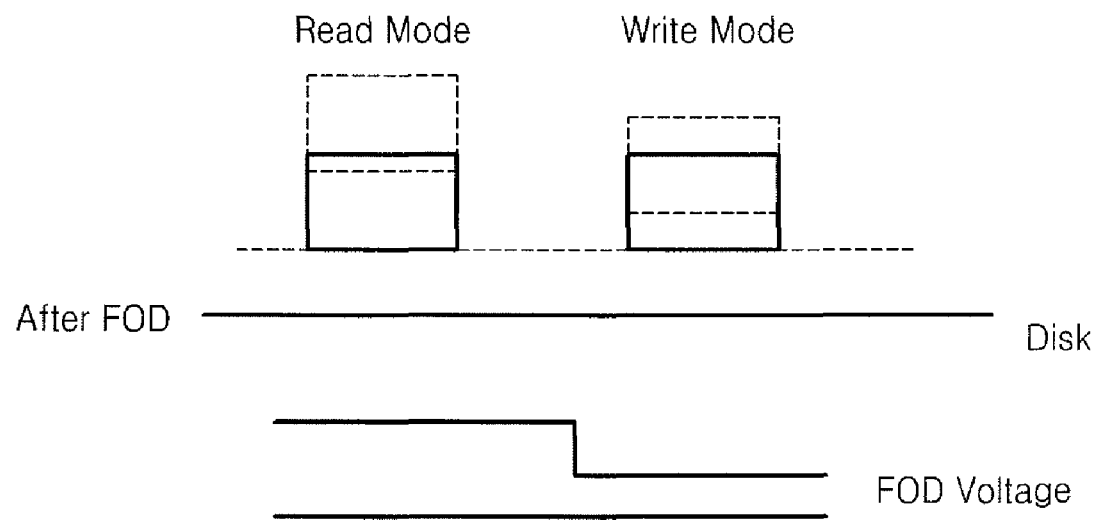
FIG. 6B is a view illustrating a flying height of a magnetic head in a read mode and a write mode after current is supplied to a heater of the magnetic head according to an embodiment of the present general inventive concept.

If no current is supplied to the heater of the magnetic head 16, the flying height of the magnetic head 16 over the disk 12 in the read mode may be different from that in the write mode as illustrated in FIG. 6A. However, when the flying height of the magnetic head 16 is adjusted by supplying the determined FOD power to the heater of the magnetic head 16, the flying height of the magnetic head 16 over the disk 12 may be equal to the target flying height in the read mode and the write mode as illustrated in FIG. 6B.

Figure 7:
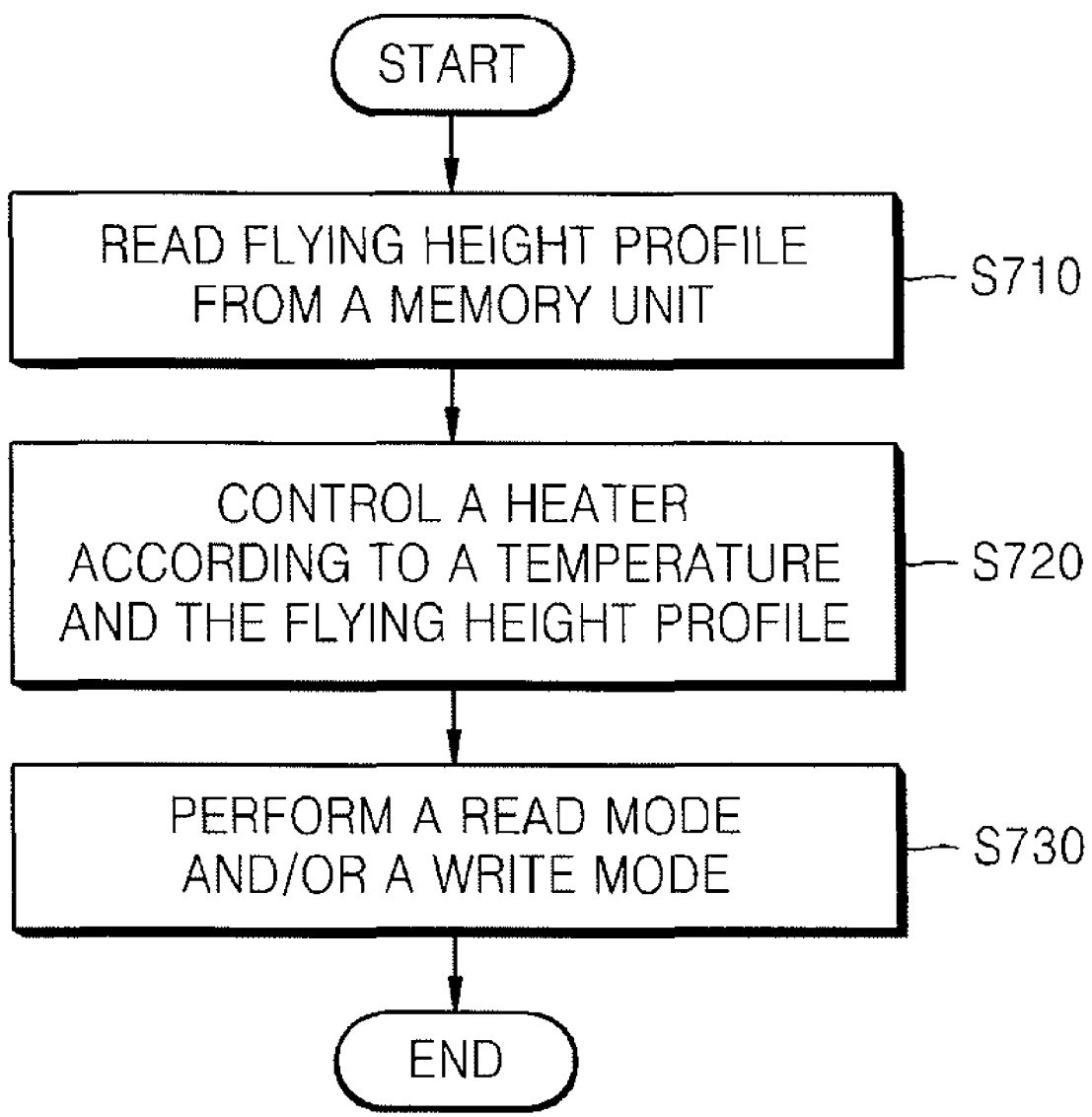
FIG. 7 is a flowchart illustrating a method of adaptively controlling a heater in an disk drive apparatus according to an embodiment of the present general inventive concept.

FIG. 7 is a flowchart illustrating a method of a disk drive apparatus according to the present general inventive concept. The method includes reading a flying height profile from a memory, such as a semiconductor memory, the ROM 350A, the RAM 350B, or the disk 12, in operation S710, detecting a temperature of the disk drive apparatus to control the heater 16a of the magnetic head 16 according to the detected temperature and the read flying height profile so as to control a flying height of the magnetic head 16 with respect to a surface of the disk 12 to correspond to a target flying height, in operation S720, and performing a reading mode and/or a write mode according to the controlling the flying height of the magnetic head 16 in operation S730. Here, the flying height profile includes a plurality of temperatures and a plurality of currents values to be applied to the heater 16a to generate heat to control the flying height according to the corresponding ones of the temperatures.

The present general inventive concept can also be embodied as computer readable codes on a computer readable medium. The computer-readable medium may include a computer-readable recording medium and a computer-readable transmission medium. The computer readable recording medium is any data storage device that can store data as a program which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

As described above, a flying height profile of a magnetic head is accurately obtained in accordance with an operating temperature of a disk drive according to the user environment and the FOD power is set based on the obtained flying height profile. Since a target flying height of the magnetic head is uniform according to a temperature variation according to the user environment, the servo control performance of the disk drive can be improved and the error rate during the data read and data write operations can be reduced.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of adaptively controlling a flying height of a magnetic head, the method comprising:

determining if a parameter reset condition related to the flying height of the magnetic head has been set;

measuring a temperature of a disk drive if the parameter reset condition has been set;

obtaining a flying height profile to represent a variation of spacing between the magnetic head and a disk according to a variation of power supplied to a heater to control the flying height of the magnetic head at the measured temperature; and determining the power that is to be supplied to the heater of the magnetic head, the power corresponding to a target flying height of the magnetic head from the obtained flying height profile.

2. The method of claim 1, wherein the parameter reset condition comprises a condition in which the disk drive into an idle mode.

3. The method of claim 1, wherein the flying height profile is obtained in a read mode and a write mode, respectively.

4. The method of claim 1, wherein the obtaining of the flying height profile comprises;

searching a reference flying height profile for a temperature closest to the measured temperature from among temperatures of flying height profiles stored in the disk drive apparatus, and calculating a temperature difference between the measured temperature and the temperature of the searched flying height profile;

comparing the calculated temperature difference with an initially set threshold value;

re-measuring the flying height profile of the magnetic head with respect to the measured temperature if the calculated temperature difference exceeds the threshold value, and storing the re-measured flying height profile; and obtaining a normalized flying height profile with respect to the measured temperature from among the flying height profiles stored in the disk drive if the calculated temperature difference does not exceed the threshold value.

5. The method of claim 4, wherein the re-measuring of the flying height profile comprises:

measuring a variation of spacing between the magnetic head and the disk with respect to the power supplied to the heater of the magnetic head, while varying the power supplied to the heater until the magnetic head contacts the disk; and obtaining the flying height profile with respect to the measured temperature.

6. The method of claim 5, wherein the variation of the spacing between the magnetic and the disk is obtained using a Wallace spacing loss equation.

7. The method of claim 6, wherein the Wallace spacing loss equation is expressed as:

$$d=(\lambda/2\pi) \times Ls$$

where d=variation of magnetic space between the disk and the magnetic head, $\lambda$=recording wavelength=linear velocity/recording frequency, Ls=Ln (TAA1/TAA2), TAA1=previous AGC gain value, and TAA2=present AGC gain value.

8. The method of claim 4, wherein the normalized flying height profile is obtained based on a correction value with respect to the variation of temperature in the flying height profile of the temperature closest to the measured temperature from among the flying height profiles stored based on temperature in the disk drive.

9. The method of claim 4, wherein the normalized flying height profile is obtained by interpolation between the flying height profiles at uppermost and lowermost temperatures closest to the measured temperature from among the flying height profiles stored in the disk drive.

10. A computer-readable recording medium on which a computer-executable program is recorded, the computer-executable program comprising:

determining if a parameter reset condition related to the flying height of the magnetic head has been set;

measuring a temperature of a disk drive if the parameter reset condition has been set;

obtaining a flying height profile representing a variation of spacing between the magnetic head and a disk in accordance with a variation of power supplied to a heater controlling the flying height of the magnetic head at the measured temperature, based on a flying height profile stored in the disk drive; and determining the power that is to be supplied to the heater, and the power corresponding to a target flying height of the magnetic head from the obtained flying height profile.

11. A disk drive comprising:

a disk to store data;

a magnetic head comprising:

a magnetic read element to detect a magnetic field over the disk;

a magnetic write element magnetize the disk; and a heater configured to generate an air bearing surface between a surface of the disk and the magnetic read element and between the surface of the disk surface and the magnetic write element, the heater to heat a structure generate the air bearing surface;

a temperature sensor to measure an operating temperature of the disk drive;

a memory to store the measured temperature and a flying height profile representing a variation of spacing between the magnetic head and the disk in accordance with a variation of power supplied to the heater;

a controller to calculate the flying height profile to represent the variation of the spacing between the magnetic head and the disk in accordance with the variation of the power supplied to the heater at the temperature measured by the temperature sensor, based on a reference flying height profile stored in the memory, if the parameter reset condition related to the flying height of the magnetic head has been set, and determining the power that is to be supplied to the heater corresponding to a target flying height of the magnetic head from the calculated flying height profile; and a current supplier to generate a current corresponding to the power determined by the controller and supplying the generated current to the heater.

12. The disk drive of claim 11, wherein the parameter reset condition related to the flying height of the magnetic head comprises a condition so as to change the disk drive into an idle mode.

13. The disk drive of claim 11, wherein the flying height profile is obtained in a read mode and a write mode respectively.

14. The disk drive of claim 11, wherein the controller searches from the memory the reference flying height profile having a temperature closest to the temperature measured by the temperature sensor, re-measures the reference flying height profile with respect to the measured temperature to store the re-measured flying height profile in the memory as the flying height profile if a temperature difference between the measured temperature and the temperature of the searched flying height profile exceeds a threshold value, and calculates a normalized flying height profile with respect to the measured temperature from the flying height profile stored based on temperature in the disk drive apparatus if the temperature difference does not exceed the threshold value.

15. The disk drive of claim 14, wherein the controller measures a variation of spacing between the magnetic head and the disk with respect to a variation of the power supplied to the heater, while varying the power supplied to the heater controlling the flying height of the magnetic head until the magnetic head contacts the disk, and obtains the flying height profile with respect to the measured temperature.

16. The disk drive of claim 15, wherein the controller calculates the variation of the spacing between the magnetic and the disk using a Wallace spacing loss equation.

17. The disk drive of claim 14, wherein the controller calculates a normalized flying height profile based on a correction value with respect to the variation of temperature in the flying height profile of the temperature closest to the measured temperature from among the flying height profiles stored based on temperature in the memory.

18. The disk drive of claim 14, wherein the controller calculates the normalized flying height profile by interpolation between the flying height profiles at uppermost and lowermost temperatures closest to the measured temperature from among the flying height profiles stored in the memory.

19. An apparatus to control a flying height of a magnetic head from a disk in a disk drive apparatus, comprising:
a controller to supply a current to a heater of the disk drive apparatus using a flying height profile to generate a spacing between a magnetic head and a disk; and
a temperature sensor to measure a temperature of the disk drive apparatus wherein the controller obtains a new flying height profile from a reference flying height profile according to the temperature measured by the temperature sensor.

20. The apparatus of claim 19, further comprising:
a memory unit disposed in the disk drive apparatus to store the obtained flying height profile.

21. The apparatus of claim 19, wherein the controller controls the heater of the disk drive apparatus according to the obtained flying height profile.

22. The apparatus of claim 19, wherein:
the obtained flying height profile comprises a first flying height profile to correspond to a read mode, and a second flying height profile to correspond to a write mode; and
the controller controls the heater according to a first current and a second current of the first flying height profile and the second flying height profile in the read mode and the write mode, respectively, to maintain a same target flying height of the spacing in the read mode and the write mode.

23. The apparatus of claim 19, wherein:
the controller supplies the current according to a reference flying height profile including a plurality of current values to be supplied to the heater, and a plurality of temperatures, and
the controller selects one of the current values as the current to be supplied to the heater.

24. A disk drive apparatus to control a flying height of a magnetic head from a disk, comprising:
a temperature sensor to detect a temperature of the disk drive apparatus;
a memory unit to store a reference flying height profile and a new flying height profile modified from the reference flying height profile according to a temperature variance of the detected temperature of the temperature sensor; and
a controller to supply a current to a heater according to the detected temperature and the new flying height profile.

25. A disk drive apparatus to control a flying height of a magnetic head from a disk, comprising:
a memory unit to store a flying height profile having a plurality of temperatures and current values to correspond to the respective temperatures;
a temperature sensor to detect a current temperature of the disk drive apparatus; and
a controller to supply a current to a heater according to one of the current values of the new flying height profile to correspond to the detected temperature.

* * * * *